(12) United States Patent
Yun (10) Patent No.: US 6,876,416 B2
(45) Date of Patent: Apr. 5, 2005

(54) LIQUID CRYSTAL DISPLAY APPARATUS HAVING ALIGNMENT FILM AND METHOD OF MANUFACTURING THE SAME

(75) Inventor: Young-Nam Yun, Seoul-si (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 10/410,338

(22) Filed: Apr. 9, 2003

(65) Prior Publication Data

US 2003/0202133 A1 Oct. 30, 2003

(30) Foreign Application Priority Data

Apr. 30, 2002 (KR) .......................................... 2002-23771
Sep. 9, 2002 (KR) ................................ 10-2002-0054335

(51) Int. Cl.[7] ........................... G02F 1/1337; G02F 1/13
(52) U.S. Cl. ......................... 349/123; 349/187; 349/138
(58) Field of Search ................................. 349/187, 123, 349/125, 126, 128, 113, 138

(56) References Cited

U.S. PATENT DOCUMENTS 5,877,832 A * 3/1999 Shimada ..................... 349/138
5,907,376 A * 5/1999 Shimada et al. ............... 349/42
6,057,038 A * 5/2000 Terashita et al. ............. 428/447
6,147,722 A * 11/2000 Shimada et al. ............... 349/43
2003/0086036 A1 * 5/2003 Yang et al. .................. 349/113

* cited by examiner

Primary Examiner—Tarifur R. Chowdhury
(74) Attorney, Agent, or Firm—Cantor Colburn LLP

(57) ABSTRACT

A liquid crystal display apparatus for improving display quality and a method of manufacturing the same are provided. The liquid crystal display includes an insulating layer having a contact hole formed on a first substrate on which switching devices and a first electrode are formed, a first alignment film formed on the first electrode. The contact hole is defined by a sidewall having first and second sidewalls. The first sidewall forms a first inclined angle with respect to the first substrate, and the second sidewall faces the first sidewall. An alignment film has alignment grooves aligned in a first direction, or from the first sidewall to the second sidewall. Accordingly, the rubbing force is enhanced in the vicinities of the contact hole, to thereby enhance the LCD apparatus display quality.

22 Claims, 9 Drawing Sheets

LIQUID CRYSTAL DISPLAY APPARATUS HAVING ALIGNMENT FILM AND METHOD OF MANUFACTURING THE SAME

BACKGROUND OF THE INVENTION

1. Field of the Invention

The disclosure relates to a liquid crystal display (LCD) apparatus and a method of manufacturing the same, and more particularly to an LCD apparatus for enhancing display quality and a method of manufacturing the same 2. Description of the Related Art Electronic display devices convert an electric signal outputted from various electronic devices into an optical signal visually perceived by users.

Recently, there is an increased requirement for flat panel display devices that have a thin and light structure and use a low driving voltage and a low power.

Liquid crystal display (LCD) devices are the most widely used type of the flat panel display devices because the LCD devices are much thinner and use much less power and driving voltage.

Figure 1:
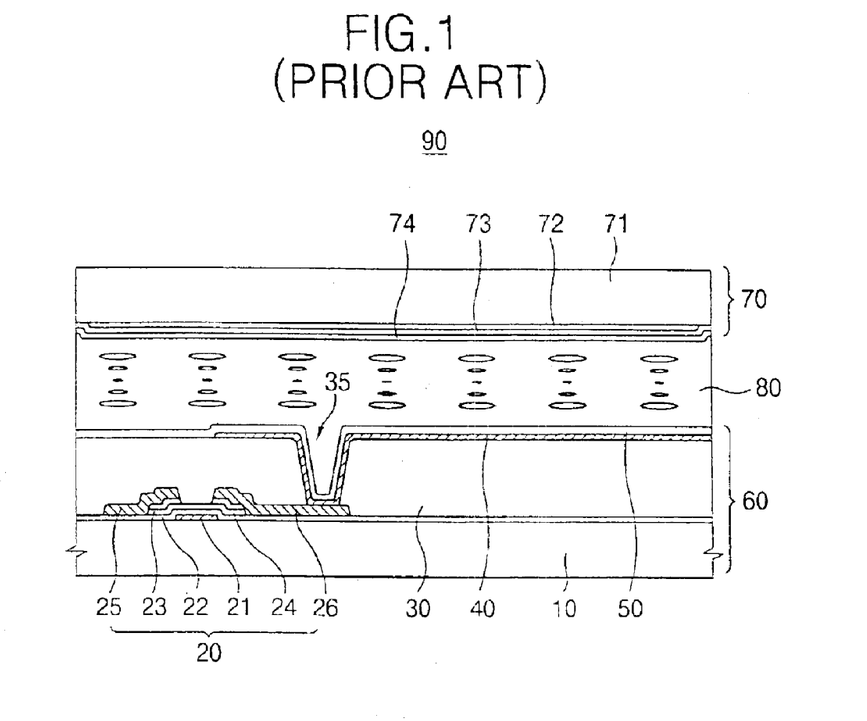
FIG. 1 is a cross-sectional view showing a general LCD panel.
Figure 2:
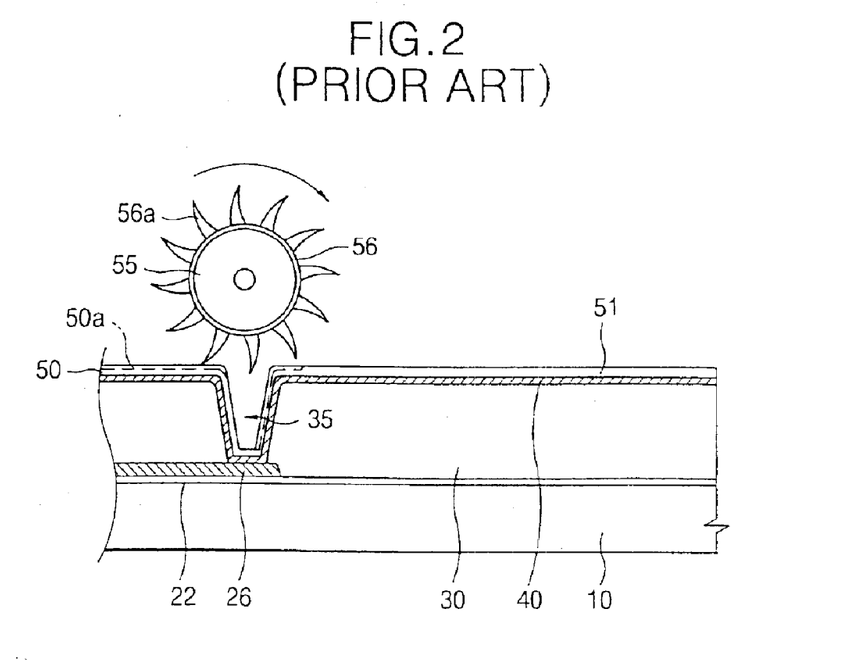
FIG. 2 is a schematic view showing a process for forming an alignment film on a TFT substrate of FIG. 1.

FIG. 1 is a cross-sectional view showing a general LCD panel, and FIG. 2 is a schematic view showing a process for forming an alignment layer on a TFT (Thin Film Transistor) substrate of FIG. 1.

Referring to FIG. 1, an LCD panel 90 includes a thin film transistor (TFT) substrate 60, a color filter substrate 70 facing the TFT substrate 60, and a liquid crystal layer 80 interposed between the TFT substrate 60 and the color filter substrate 70.

The TFT substrate 60 includes a first substrate 10, TFTs 20 formed on the first substrate 10, an organic insulating layer 30 formed on the first substrate 10 having the TFTs 20, a pixel electrode 40 formed on the organic insulating layer 30, and a first alignment film 50 formed on the pixel electrode 40.

Each of the TFTs 20 includes a gate electrode 21, a source electrode 25 and a drain electrode 26. The gate electrode 21 is insulated from the source electrode 25 and the drain electrode 26 by a gate insulating layer 22. An active pattern 23 and an ohmic contact pattern 24 are formed on the gate insulating layer 22 so that the source electrode 25 is electrically connected to the drain electrode 26 through the active pattern 23 and the ohmic contact pattern 24 in response to an electric power applied to the gate electrode 21. The source electrode 25 and the drain electrode 26 are formed on the active pattern 23 and the ohmic contact pattern 24.

The organic insulating layer 30 is formed on the TFTs 20. A contact hole 35 is formed on the organic insulating layer 30 to expose the drain electrode 26. The pixel electrode 40 is uniformly formed on the organic insulating layer 30, the drain electrode 26 exposed through the contact hole 35 and the sidewalls of the contact hole 35. The first alignment film 50 is formed on the pixel electrode 40, and has a plurality of alignment grooves (not shown) extended in a predetermined direction or a rubbing direction.

The color filter substrate 70 includes a second substrate 71, color filters 72, a common electrode 73 and a second alignment film 74. The common electrode 73 faces the pixel electrode 40 to be opposite to the TFT substrate 60. The color filter substrate 70 is coupled to the TFT substrate 60 to face each other, and the liquid crystal layer 80 is interposed between the color filter substrate 70 and the TFT substrate 60.

The liquid crystal is aligned in a predetermined direction so that light passes through the liquid crystal layer 80. The liquid crystal is aligned by the first and the second alignment films (50, 74). Hereinafter, the process for forming the first alignment film 50 is described.

Referring to FIG. 2, a polyimide thin film 51 is deposited on the pixel electrode 40. The thin film 51 is formed as a first alignment film 50 having a plurality of alignment grooves 50a through a rubbing process. A rubbing fabric (or rubbing cloth) 56 having a plurality of rubbing piles 56a is attached to an outer surface of a rubbing roller 55. When the rubbing roller 55 is disposed on the thin film 51 and is moved in a predetermined direction or a rubbing direction, the thin film 51 is rubbed by the rubbing piles 56a. Accordingly, the alignment grooves 50a are formed on the thin film 51 along the direction in which the rubbing roller 55 moves. An alignment groove may not be formed when other rubbing process is performed on the thin film 51.

However, the thin alignment grooves 50a may not be formed on the thin film 51 deposited on the contact hole 35, because the alignment is incompletely made at the sidewalls of the contact hole 35 due to a stepped surface of the contact hole 35. Light leakage phenomenon may occur in a black mode of the LCD device because the liquid crystal is incompletely aligned near the contact hole 35. Therefore, the display quality of the LCD device is deteriorated.

BRIEF SUMMARY OF THE INVENTION

Accordingly, the present invention provides a liquid crystal display apparatus capable of enhancing display quality.

The present invention provides a method of manufacturing a liquid crystal display apparatus capable of enhancing display quality.

According to one aspect of the invention, there is provided a liquid crystal display apparatus comprising: an array substrate including a first substrate, an insulating layer having a contact hole, the contact hole having a first sidewall and a second sidewall, the first sidewall having a first inclined face forming a first angle with respect to the first substrate, the second sidewall facing the first sidewall, and a first alignment layer formed on the insulating layer, the first alignment layer aligned from the first sidewall toward the second sidewall; a color filter substrate including a second substrate and a second alignment layer formed on the second substrate; and a liquid crystal layer disposed between the array substrate and the color filter substrate.

According to another aspect of the invention, there is provided a method of manufacturing a liquid crystal display apparatus comprising: depositing an insulating layer on a first substrate of an array substrate, forming a contact hole, the contact hole having a first sidewall and a second sidewall, the first sidewall having an inclined face forming a first angle with respect to the first substrate, the second sidewall facing the first sidewall, depositing a thin film on the insulating layer, forming a first alignment layer on the insulating layer by rubbing the thin film in a first direction; forming a second alignment layer on a second substrate of a color filter substrate in a second direction; coupling the array substrate to the color filter substrate; and interposing a liquid crystal layer between the array substrate and the color filter substrate.

According to the liquid crystal display apparatus and the method of manufacturing the liquid crystal display apparatus, an insulating layer is formed on a first substrate on which switching devices are formed, and a contact hole is formed on the insulating layer. The contact hole is defined by a sidewall having at least one first sidewall and a second sidewall. The first sidewall forms a first inclined angle (θ1) with respect to the first substrate, and the second sidewall faces the first sidewall. An alignment film is aligned in a first direction, or from the first sidewall to the second sidewall.

Accordingly, the rubbing force is enhanced in the vicinities of the contact hole, to thereby prevent the light leakage phenomenon from occurring. In addition, the LCD apparatus display quality can be enhanced.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF PREFERRED EMBODIMENTS

Figure 3:
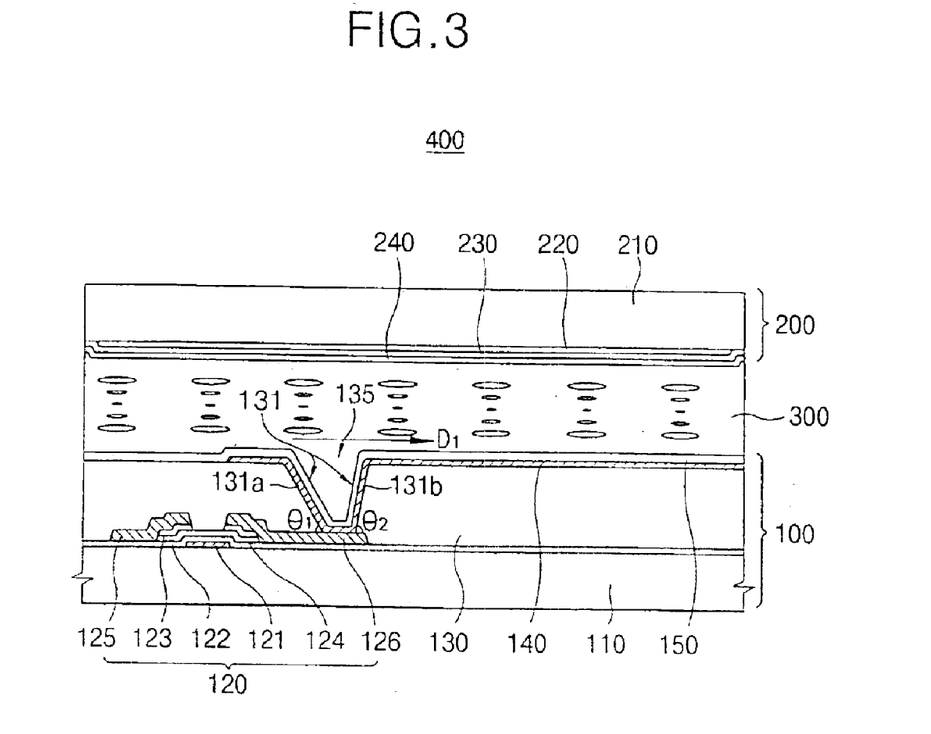
FIG. 3 is a cross-sectional view showing an LCD panel according to a first exemplary embodiment of the present invention.
Figure 4:
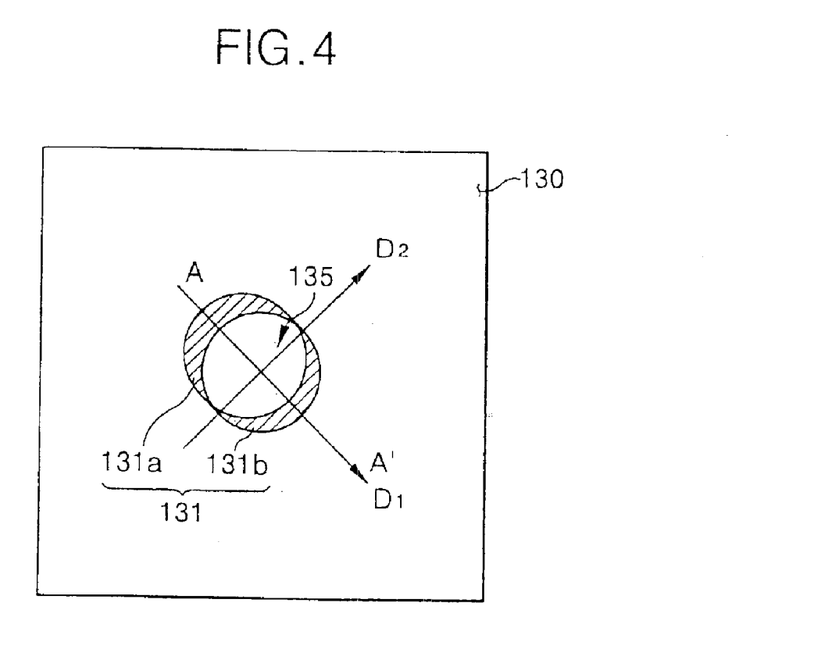
FIG. 4 is a schematic view showing a contact hole of FIG. 3 with regard to a rubbing direction.

FIG. 3 is a cross-sectional view showing an LCD panel according to a first exemplary embodiment of the present invention, and FIG. 4 is a schematic view showing a contact hole of FIG. 3 with regard to a rubbing direction.

Referring to FIG. 3, a liquid crystal display panel 400 of a liquid crystal display apparatus includes a TFT substrate (or array substrate) 100, a color filter substrate 200 facing the TFT substrate 100, and a liquid crystal layer 300.

The TFT substrate 100 includes a first substrate 110, TFTs 120 formed on the first substrate 110, an organic insulating layer 130 formed on the first substrate 110 on which the TFTs 120 are formed, a pixel electrode 140 formed on the organic insulating layer 130, and a first alignment film 150 formed on the pixel electrode 140.

The TFT 120 includes a gate electrode 121, a source electrode 125 and a drain electrode 126. The gate electrode 121 is insulated from the source electrode 125 and the drain electrode 126 by a gate insulating layer 122. An active pattern 123 and an ohmic contact pattern 124 are formed on the gate insulating layer 122. The source electrode 125 is electrically connected to the drain electrode 126 through the active pattern 123 and the ohmic contact pattern 124, in response to an electric power signal applied to the gate electrode 121. The source electrode 125 and the drain electrode 126 are formed on the active pattern 123 and the ohmic contact pattern 124.

The organic insulating layer 130 is formed on the TFTs 120. A contact hole 135 is formed on the organic insulating layer 130 to expose the drain electrode 126. The contact hole 135 includes sidewalls 131. The sidewalls 131 include a first sidewall and a second sidewall. The first sidewall has a first inclined face 131a forming a first angle (θ1) with respect to the first substrate 110. The second sidewall faces the first sidewall. The second sidewall has a second inclined face 131b forming a second angle (θ2) with respect to the first substrate 110, and the second angle (θ2) is greater than the first angle (θ1). The first and second inclined faces 131a and 131b include a substantially curved face or a flat face depending on a shape of the contact hole 135.

The first and the second inclined angles (θ1, θ2) are acute angles, preferably, the first inclined angle (θ1) is about 30° or less, and the second angle (θ2) is in a range of about 30° to about 60°.

As shown in FIG. 3 and FIG. 4, the first alignment film 150 has rubbing grooves aligned in a first direction (D1). An alignment groove may not be formed on the first alignment film 150 when other rubbing process is performed on the first alignment film 150. The first and second inclined faces 131a and 131b of FIG. 3 show the case in which the contact hole 135 is cut along A–A' line of FIG. 4. The first direction (D1) is from the first inclined face 131a to the second inclined face 131b. For instance, the first alignment film 150 has rubbing grooves aligned in the first direction (D1) or from the first inclined face 131a to the second inclined face 131b. The first inclined face 131a is rubbed, and then the second inclined face 131b is rubbed. Accordingly, the alignment force may be enhanced at the sidewall 131 of the contact hole 135.

The pixel electrode 140 is uniformly formed on the drain electrode 126, the sidewalls 131 and the organic insulating layer 130. The first alignment film 150 having rubbing grooves aligned in a predetermined direction is formed on the pixel electrode 140.

Color filters 220, a common electrode 230 and a second alignment film 240 are successively formed on a second substrate 210, to thereby form the color filter substrate 200. The second alignment film 240 has rubbing grooves aligned in a second direction (D2) substantially perpendicular to the first direction (D1). The color filter substrate 200 couples to the TFT substrate 100 to face the TFT substrate 100. The common electrode 230 faces the pixel electrode 140. The liquid crystal layer 300 is interposed between the color filter substrate 200 and the TFT substrate 100.

Hereinafter, a method of manufacturing the TFT substrate 100 is described.

FIGS. 5A to 5F are cross-sectional views showing a process for manufacturing the TFT substrate of FIG. 3.

Figure 5A:
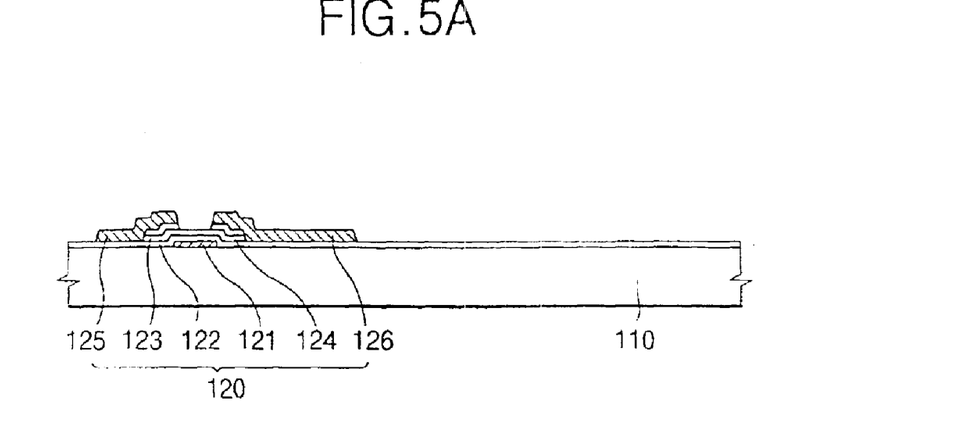
FIGS. 5A to 5F are cross-sectional views showing a process for manufacturing the TFT substrate of FIG. 3.

Referring to FIG. 5A, a first metal (not shown) is deposited by a sputtering process on the first substrate 110. The first metal comprises aluminum (Al), chrome (Cr) or molybdenum-tungsten (MoW), and the first substrate 110 compriss insulating material such as a glass or ceramic and the like. Then, the first metal layer is patterned by a photolithography process to form a gate line (not shown) and a gate electrode 121 branched from the gate line. A sidewall of the gate electrode 121 has a tapered profile.

Silicon nitride is deposited by a plasma-enhanced chemical vapor deposition (PECVD) method on the entire surface of the first substrate 110 on which the gate line and the gate electrode 121 are formed, thereby to form the gate insulating layer 122.

An active layer (not shown), e.g., an amorphous silicon layer, is deposited by the PECVD method on the gate insulating layer 122, and then an ohmic contact layer (not shown), e.g., $n^+$ doped amorphous silicon layer, is deposited by the PECVD method on the active layer. The amorphous silicon layer and the $n^+$ doped amorphous silicon layer are deposited by in-situ process in a chamber of the PECVD equipment. Then, the ohmic contact layer and the active layer are successively patterned by a photolithography method to form an active pattern 123 and an ohmic contact pattern 124 on the gate insulating layer 122 over the gate electrode 121, respectively. The active pattern 123 comprises the amorphous silicon layer, and the ohmic contact pattern 124 comprises the $n^+$ doped amorphous silicon layer.

A second metal layer (not shown), comprising metal, such as chrome (Cr), is deposited by a sputtering method on the entire surface of the resultant structure. The second metal layer is patterned by a photolithography process to form a data line (not shown) perpendicular to the gate line, the source electrode 125 and the drain electrode 126 branched from the data line, thereby to complete the TFTs 120. The gate insulating layer 122 interposed between the gate line and the data line prevents the gate line from being electrically contacted to the data line.

The ohmic contact pattern 124, which is exposed between the source electrode 125 and the drain electrode 126, is removed by a reactive ion etching (RIE) method. Accordingly, the active pattern region exposed between the source electrode 125 and the drain electrode 126 serves as a channel region of the TFTs (thin film transistors) 120.

Figure 5B:
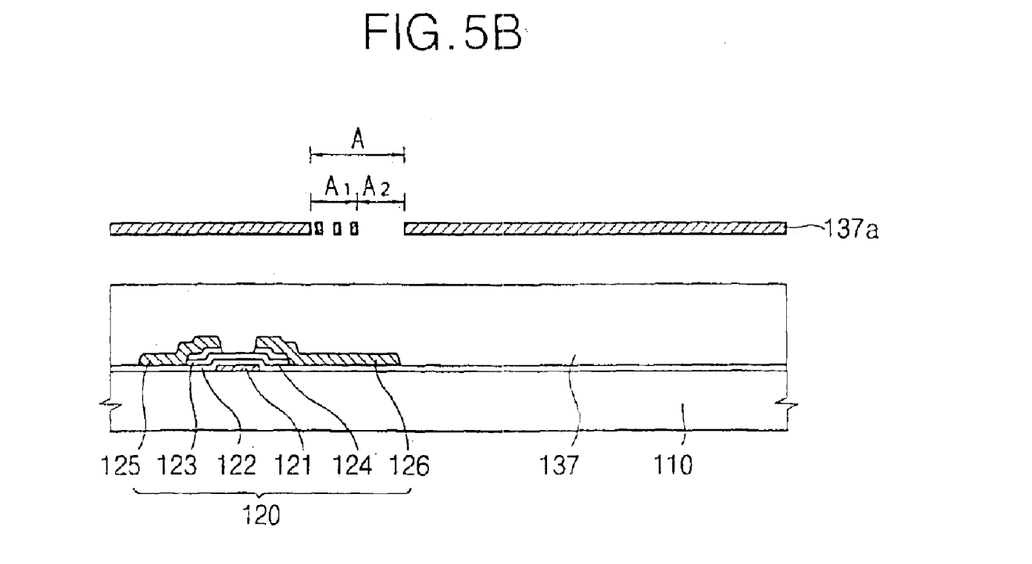

Referring to FIG. 5B, an insulating layer, for example, a photosensitive organic insulating layer 137 is formed by a spin coating method or a slit coating method on the entire surface of the first substrate 110 on which the TFTs 120 are formed. The photosensitive organic insulating layer 137 comprises an acrylic resin etc., and electrically insulates the source/drain electrodes 125 and 126 from the pixel electrode 140.

A mask 137a having a pattern corresponding to the contact hole 135 is deposited over the organic insulating layer 137 in order to form the contact hole 135 through the organic insulating layer 137. For instance, the mask 137a includes a region (A) for forming the contact hole 135 having a slit exposure region (A1) and a full exposure region (A2). An amount of an exposure portion of the slit exposure region (A1) is less than that of the full exposure region (A2). The slit exposure region (A1) corresponds to the first inclined face 131a.

For instance, the organic insulating layer 137 corresponding to the slit exposure region (A1) is exposed by a slit exposure process, and the organic insulating layer 137 corresponding to the full exposure region (A2) is exposed by a full exposure process.

Figure 5C:
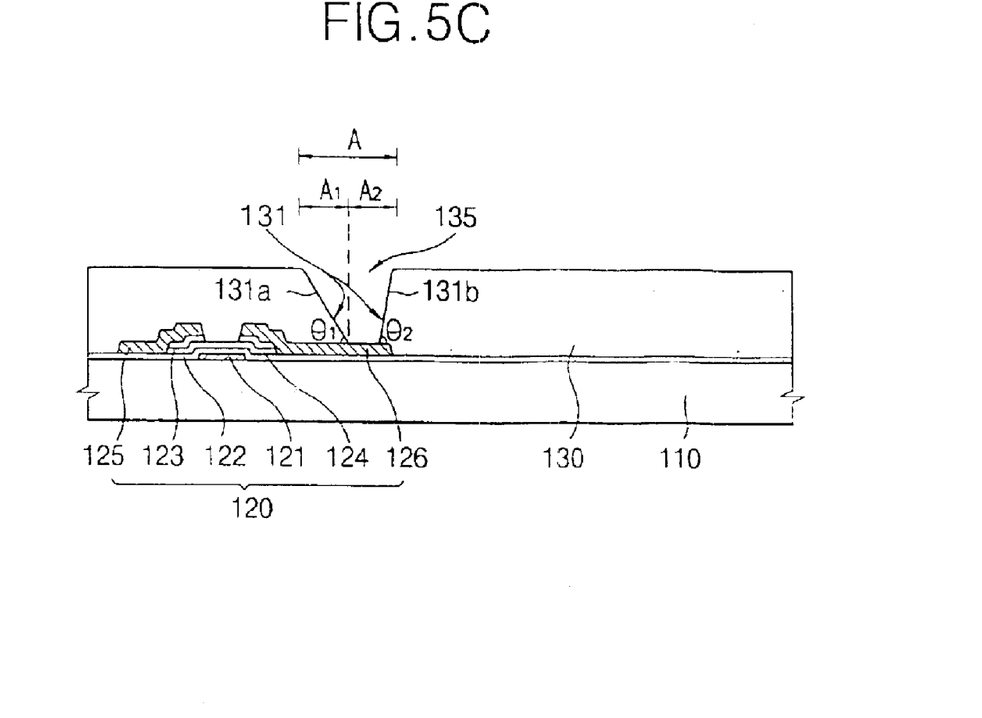

Referring to FIG. 5C, the organic insulating layer 137 is developed with a solution including tetramethyl-ammonium hydroxide (TMAH), to thereby form the contact hole 135. The contact hole 135 exposes the drain electrode 126. The first inclined face 131a forming the first inclined angle ($\theta 1$) with respect to the first substrate 110 is formed on a portion of the sidewalls 131 corresponding to the slit exposure region (A1). In addition, the second inclined face 131b is formed on a portion of the sidewalls 131 corresponding to an edge of the full exposure region (A2).

The first inclined angle ($\theta 1$) is less than the second inclined angle ($\theta 2$). For example, the first inclined angle ($\theta 1$) is less than about 30° and the second inclined angle ($\theta 2$) is in a range of about 30° to about 60°.

Figure 5D:
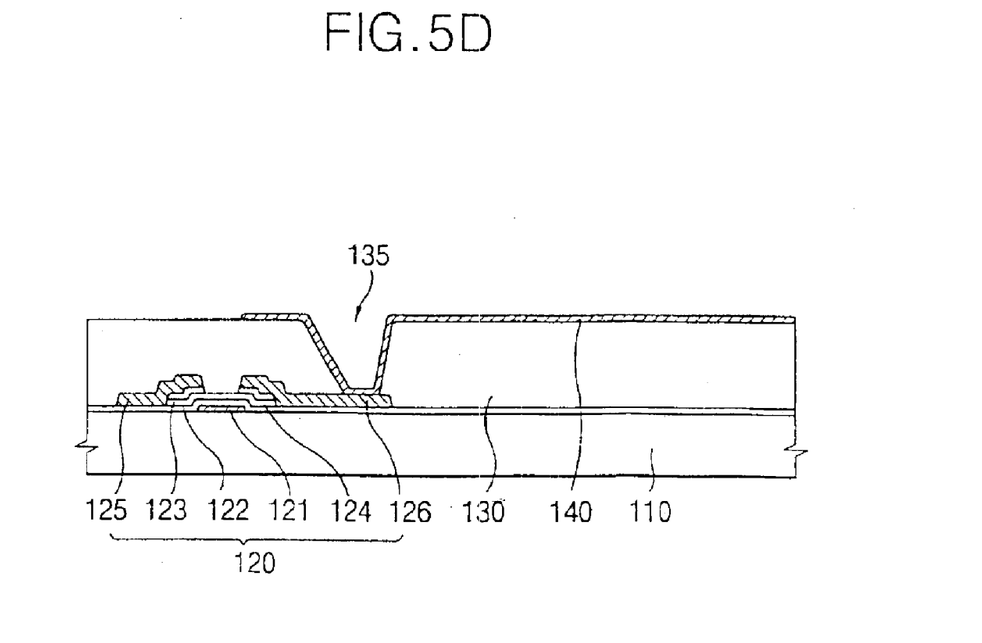

Referring to FIG. 5D, a transparent conductive layer is deposited on the organic insulating layer 130 and the contact hole 135. The transparent conductive layer comprises a conductive material such as indium tin oxide (ITO) or indium zinc oxide (IZO). The transparent conductive layer is patterned by photolithography, to thereby form the pixel electrode 140. The pixel electrode 140 is connected to the drain electrode 126 through the contact hole 135.

Figure 5E:
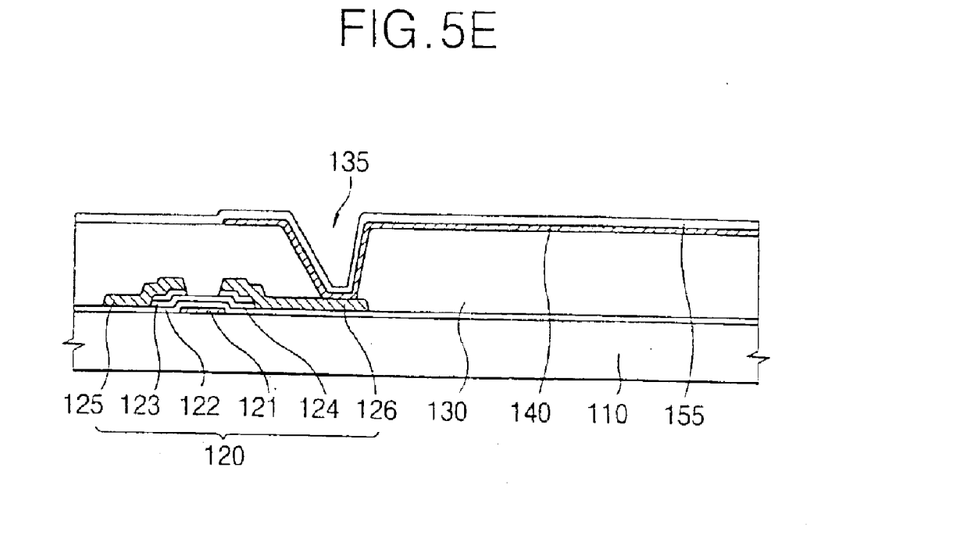
Figure 5F:
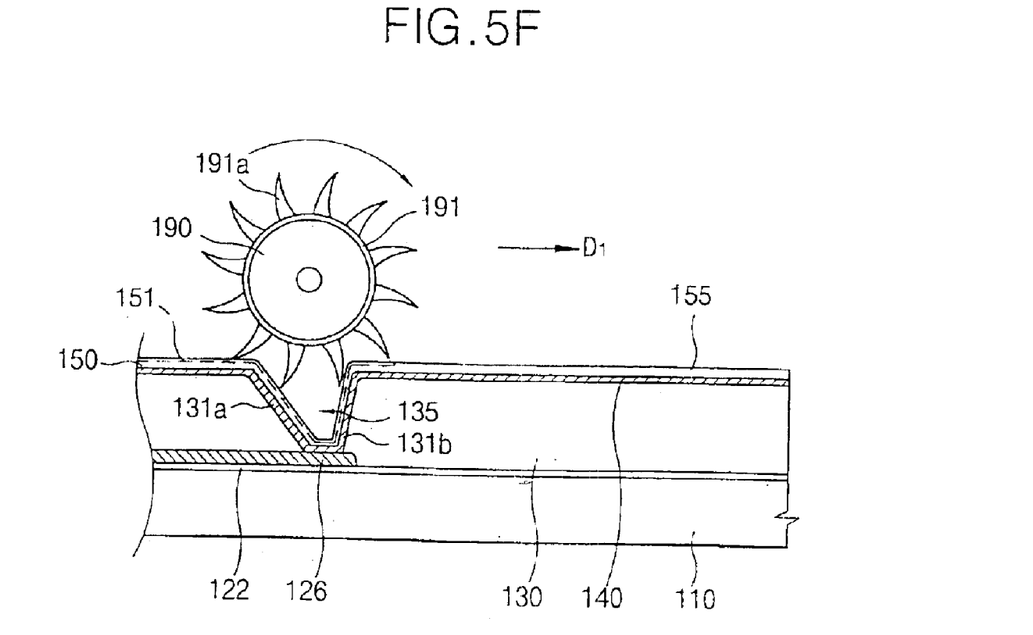

Referring to FIG. 5E and FIG. 5F, a polyimide thin film 155 is formed on the pixel electrode 140. A rubbing process is performed on the thin film 155 to form the first alignment film 150 having a plurality of alignment grooves 151.

A rubbing fabric (or rubbing cloth) 191 having a plurality of rubbing piles 191a is attached to an outer surface of a rubbing roller 190. When the rubbing roller 190 is positioned on the thin film 155 and is moved in a predetermined direction or a rubbing direction, the thin film 155 is rubbed by the rubbing piles 191a. Accordingly, the alignment grooves 151 are formed on the thin film 155 along the direction in which the rubbing roller 190 moves. The rubbing roller 190 moves and rubs the thin film 155 in a first direction (D1), or from the first inclined face 131a to the second inclined face 131b.

Referring to FIG. 5F, the first inclined face 131a has a gentle slope, so that the alignment groove 151 may be formed on the first inclined face 131a. The liquid crystal 180 may be aligned in the vicinities of the first inclined face 131a, to thereby prevent the light leakage phenomenon from occurring in a black mode of the LCD device.

Figure 6:
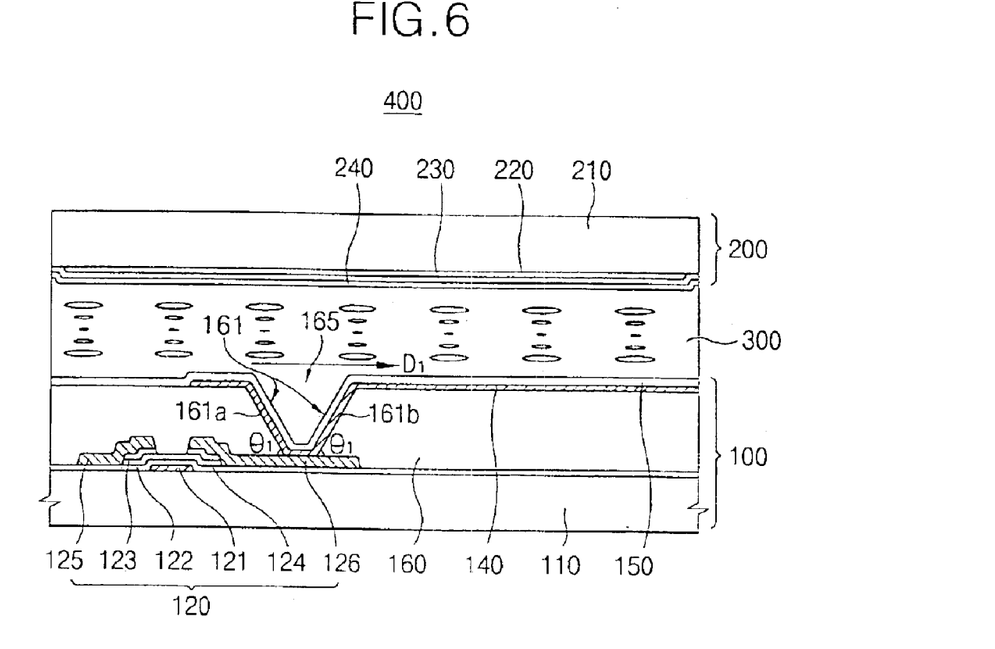
FIG. 6 is a cross-sectional view showing an LCD panel according to a second exemplary embodiment of the present invention.
Figure 7:
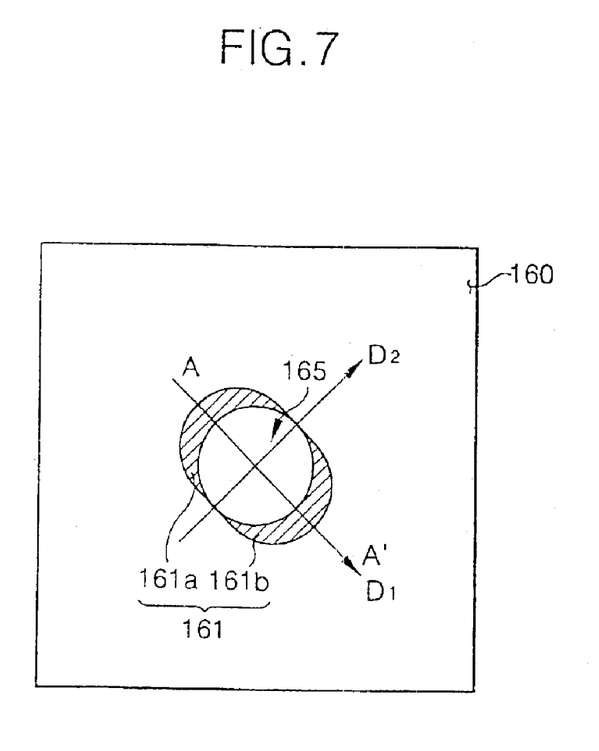
FIG. 7 is a schematic view showing a contact hole of FIG. 6 with regard to a rubbing direction.

FIG. 6 is a cross-sectional view showing an LCD panel according to a second exemplary embodiment of the present invention, and FIG. 7 is a schematic view showing a contact hole of FIG. 6 with regard to a rubbing direction.

Referring to FIG. 6, an organic insulating layer 160 is formed on a first substrate 110 on which TFTs 120 are formed. A contact hole 165 is formed on the organic insulating layer 160 to expose a drain electrode 126. The contact hole 165 includes sidewalls 161. The sidewalls 161 include a first sidewall and a second sidewall. The first sidewall has a first inclined face 161a forming a first inclined angle ($\theta 1$) with respect to the first substrate 110. The second sidewall faces the first sidewall. The second sidewall has a second inclined face 161b forming the first inclined angle ($\theta 1$) with respect to the first substrate 110.

The first inclined angle ($\theta 1$) is an acute angle, preferably, the first inclined angle ($\theta 1$) is less than about 30°.

As shown in FIG. 6 and FIG. 7, a first alignment film 150 having rubbing grooves aligned in a first direction (D1) is formed on the organic insulating layer 160.

The first and second inclined faces (161a, 161b) of FIG. 6 show the case in which the contact hole 165 is cut along A–A' line of FIG. 7. Specifically, the first direction (D1) is from the first inclined face 161a to the second inclined face 161b. For instance, the first alignment film 150 has rubbing grooves aligned in the first direction (D1) or from the first inclined face 161a to the second inclined face 161b. The first inclined face 161a is rubbed and then the second inclined face 161b is rubbed. Accordingly, the alignment force may be enhanced at the sidewalls 161 of the contact hole 165.

Hereinafter, a third and a fourth exemplary embodiments, in which an embossing pattern is formed on a surface of an organic insulating layer, is described. A structure in which the embossing pattern is formed on a surface of the organic insulating layer is employed for a reflective type LCD device or a transmissive and reflective type LCD device. Accordingly, FIGS. 8 to 12 represent the reflective LCD device having the structure in which the embossing pattern is formed on a surface of the organic insulating layer, as according to the third and fourth exemplary embodiments.

Figure 8:
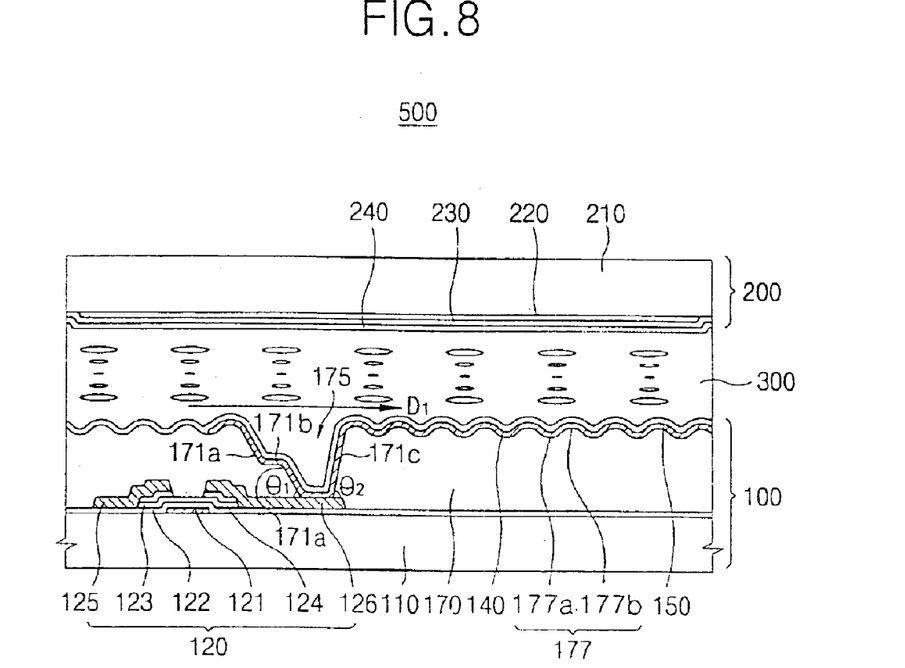
FIG. 8 is a cross-sectional view showing an LCD panel according to a third exemplary embodiment of the present invention.
Figure 9:
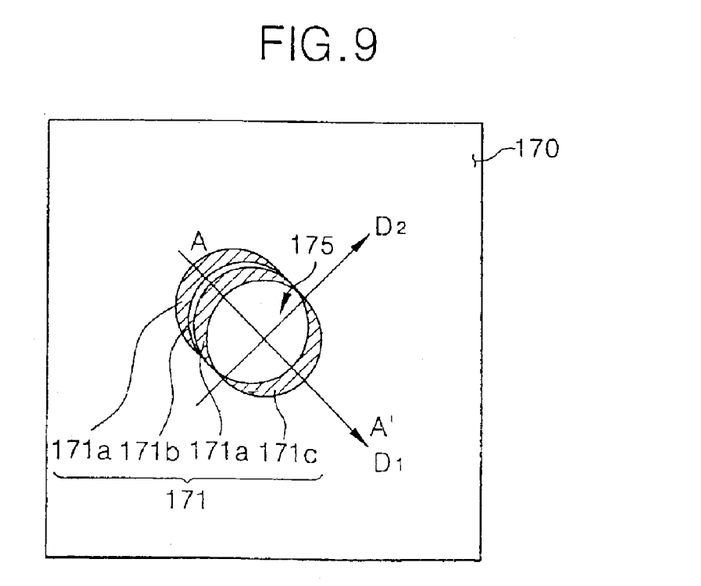
FIG. 9 is a schematic view showing a contact hole of FIG. 8 with regard to a rubbing direction.

FIG. 8 is a cross-sectional view showing an LCD panel according to a third exemplary embodiment of the present invention, FIG. 9 is a schematic view showing a contact hole of FIG. 8 with regard to a rubbing direction.

Referring to FIG. 8, a reflective LCD panel 500 of a liquid crystal display apparatus includes a TFT substrate 100, a color filter substrate 200 facing the TFT substrate 100, and a liquid crystal layer 300.

The TFT substrate 100 includes a first substrate 110, TFTs 120 formed on the first substrate 110, an organic insulating layer 170 formed on the first substrate 110 on which the TFTs 120 are formed, a reflective electrode 140 formed on the organic insulating layer 170, and an alignment film 150 formed on the reflective electrode 140. A plurality of pixels is arranged in a matrix shape on the TFT substrate 110.

The organic insulating layer 170 is formed on the TFT substrate 110 on which the TFTs 120 are formed. A contact hole 175 is formed on the organic insulating layer 170 to expose a drain electrode 126. An embossing pattern 177 is formed on a surface of the organic insulating layer 170. The embossing pattern 177 has repeated pairs of a concave portion 177a and a convex portion 177b. The concave portion 177a and the convex portion 177b have heights different from each other. Since the embossing pattern 177 is formed on the organic insulating layer 170, the area of the reflective electrode 140 increases. As a result, refection efficiency is enhanced, and a reflection angle is regulated, to thereby enhance a viewing angle.

The contact hole 175 is defined by sidewalls 171. The sidewalls 171 include a first sidewall and a second sidewall. The first sidewall has a plurality of first inclined faces 171a and a flat face 171b to have a stepped shape. Each of the first inclined faces 171a forms a first inclined angle (θ1) with respect to the first substrate 110. The flat face 171b is formed between the first inclined faces 171a to connect the first inclined faces 171a. The second sidewall faces the first sidewall. The second sidewall has a second inclined face 171c forming a second inclined angle (θ2) with respect to the first substrate 110, and the second incident angle (θ2) is greater than the first angle (θ1). The first incident angle (θ1) is an acute angle, preferably in a range of about 30° to about 60°.

As shown in FIG. 8 and FIG. 9, the first alignment film 150 has rubbing grooves aligned in a first direction (D1). The first and second inclined faces (171a, 171c) of FIG. 8 show the case in which the contact hole 175 is cut along A–A' line of FIG. 9. The first direction (D1) is from the first inclined faces 171a to the second inclined face 171c. The first alignment film 150 is formed by rubbing a thin film (not shown) in the first direction (D1) or from the first inclined faces 171a to the second inclined face 171c. The first inclined faces 171a are rubbed and then the second inclined face 171c is rubbed. Thus, the sidewalls 171 have a gentle slope, and the alignment force may be enhanced at the sidewall 171 of the contact hole 175.

Hereinafter, a method of manufacturing the TFT substrate is described in detail.

Figure 10A:
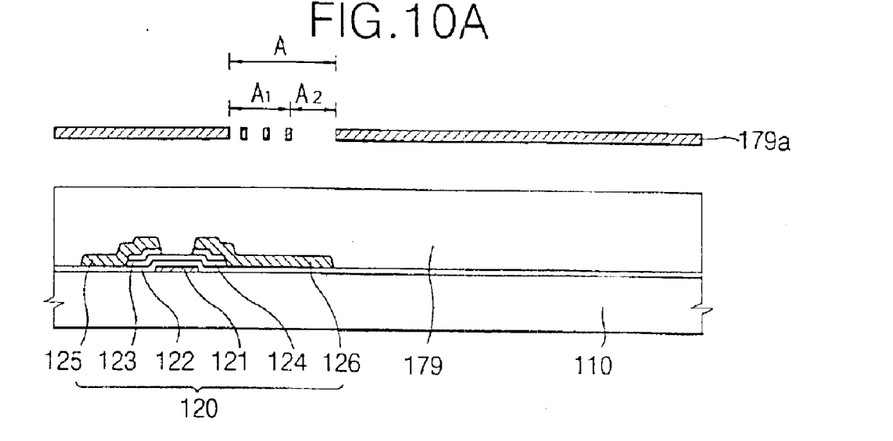
FIGS. 10A to 10C are cross-sectional views showing a process for manufacturing the TFT substrate of FIG. 8.
Figure 10B:
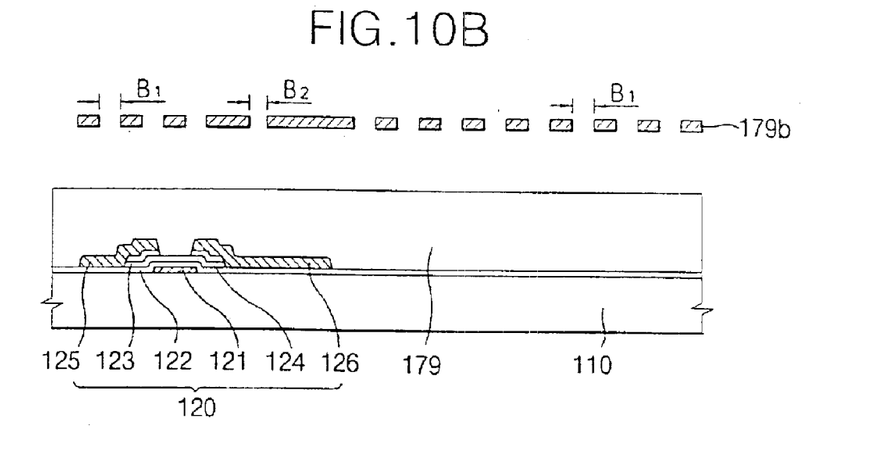
Figure 10C:
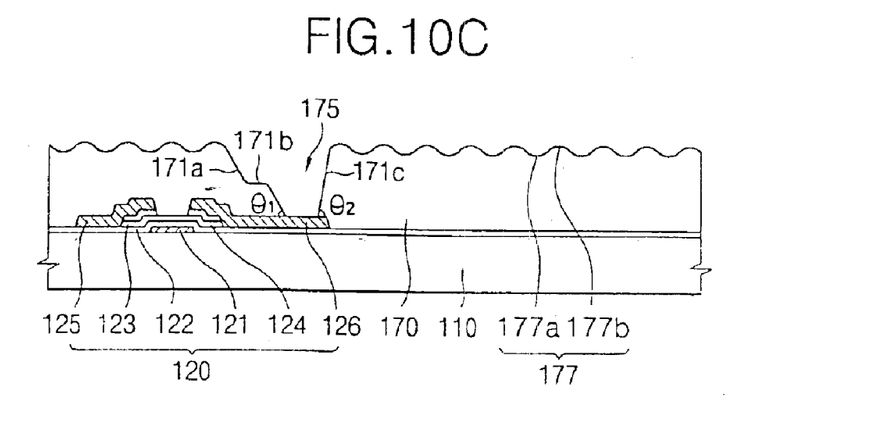

FIGS. 10A to 10C are cross-sectional views showing a process for manufacturing the TFT substrate of FIG. 8. In the FIGS. 10A to 10C, two exposure processes are performed so as to form an organic insulating layer.

Referring to FIG. 10A, an insulating layer, for example a photosensitive organic insulating layer 179, comprising acrylic resin etc., is formed by a spin coating method or a slit coating method on the entire surface of the first substrate 110 on which the TFTs 120 are formed. The photosensitive organic insulating layer 179 electrically insulates data wirings from the reflective electrode 140.

The photosensitive organic insulating layer 179 is exposed so as to form the contact hole 175. A mask 179a having a pattern corresponding to the contact hole 175 is positioned over the photosensitive organic insulating layer 179, and then the photosensitive organic insulating layer 179 is exposed in order to form the contact hole 175. For instance, the mask 179a has a region (A) for forming the contact hole 175 having a slit exposure region (A1) and a full exposure region (A2). The slit exposure region (A1) has an exposure portion less than that of the full exposure region (A2). The slit exposure region (A1) corresponds to the first inclined faces 171a and the second inclined face 171c of the sidewalls 171.

Hereinafter, a second exposure process for exposing the photosensitive organic insulating layer 179 is performed so as to form an embossing pattern on the photosensitive organic insulating layer 179.

Referring to FIG. 10B, a second mask 179b is formed on the photosensitive organic insulating layer 179, and then the layer 179 is exposed. The second mask 179b has a pattern corresponding to the embossing pattern 177. For instance, the second mask 179b includes a first half exposure region (B1) and a second half exposure region (B2). The first half exposure region (B1) corresponds to the concave portion 177a of the embossing pattern 177, and the second half exposure region (B2) corresponds to the sidewalls 171, especially the flat face 171b disposed between the first inclined faces 171a.

Referring to FIG. 10C, the photosensitive organic insulating layer 179 is developed by a solution including tetramethyl-ammonium hydroxide (TMAH), and the contact hole 175 and the embossing pattern 177 are formed, to thereby complete the organic insulating layer 170. The contact hole 175 exposes the drain electrode 126.

As described above, the sidewalls 171 defining the contact hole 175 corresponds to the slit exposure region (A1). The sidewalls 171 include the first sidewall and the second sidewall. The first sidewall has the first inclined faces 171a and the flat face 171b to have a stepped shape. Each of the first inclined faces 171a forms the first inclined angle (θ1) with respect to the first substrate 110. The flat face 171b corresponds to the second half exposure region (B2) and is formed between the first inclined faces 171a to connect the first inclined faces 171a. The second sidewall faces the first sidewall. The second sidewall corresponds to an edge of the full exposure region (A2). The second sidewall has the second inclined face 171c forming the second inclined angle (θ2) with respect to the first substrate 110, and the second incident angle (θ2) is greater than the first angle (θ1). The first incident angle (θ1) is less than about 30°. Preferably, the second incident angle (θ2) is in a range of about 30° to about 60°.

Figure 11:
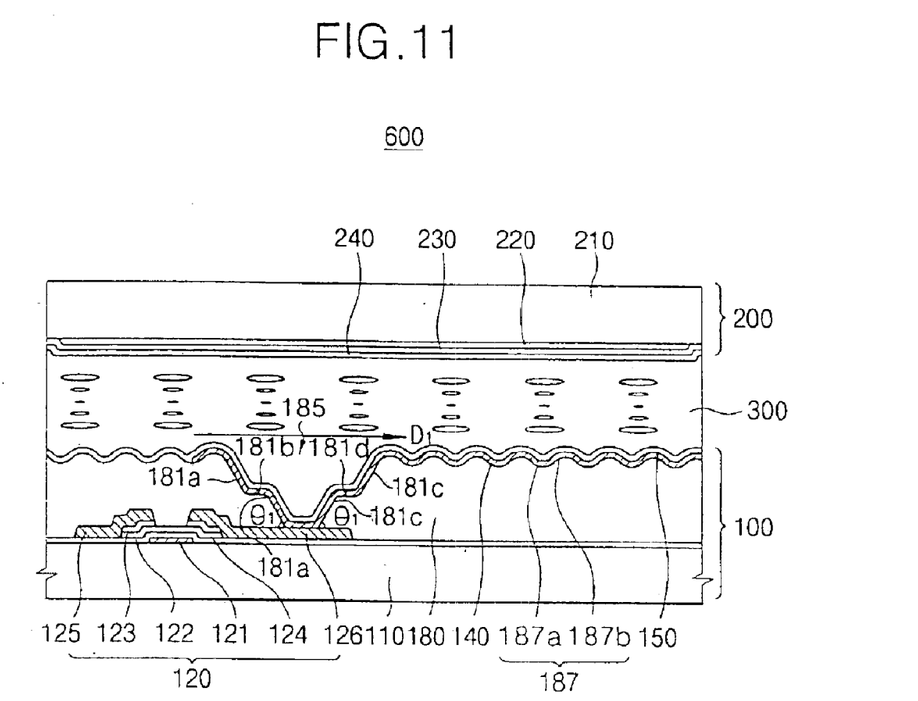
FIG. 11 is a cross-sectional view showing an LCD panel according to a fourth exemplary embodiment of the present invention.
Figure 12:
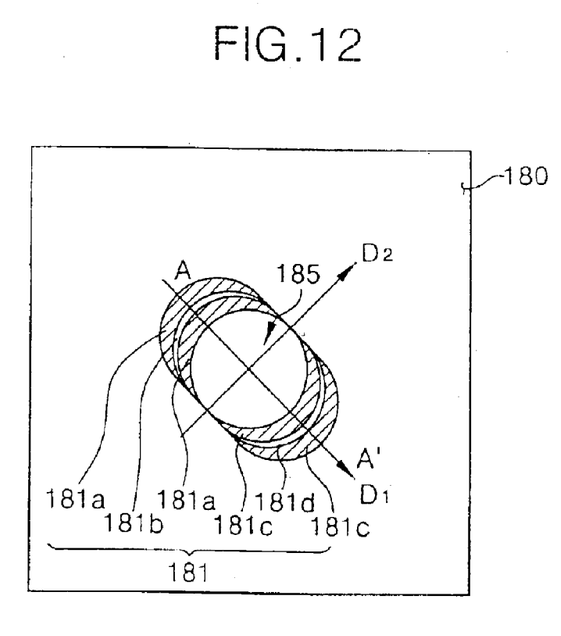
FIG. 12 is a schematic view showing a contact hole of FIG. 11 with regard to a rubbing direction.

FIG. 11 is a cross-sectional view showing an LCD panel 600 according to a fourth exemplary embodiment of the present invention, and FIG. 12 is a schematic view showing a contact hole of FIG. 11 with regard to a rubbing direction.

Referring to FIG. 11, an organic insulating layer 180 is formed on a TFT substrate 110 on which TFTs 120 are formed. A contact hole 185 is formed on the organic insulating layer 180 to expose a drain electrode 126. An embossing pattern 187 is formed on a surface of the organic insulating layer 180. The embossing pattern 187 has repeated pairs of a concave portion 187a and a convex portion 187b. The concave portion 187a and the convex portion 187b have heights difference from each other. The contact hole 185 is defined by sidewalls 181.

For instance, the sidewalls 181 include a first sidewall and a second sidewall. The first sidewall has a plurality of first inclined faces 181a and a first flat face 181b to have a stepped shape. Each of the first inclined faces 181a forms a first inclined angle (θ1) with respect to the first substrate 110. The first flat face 181b is formed between the first inclined faces 181a to connect the first inclined faces 181a. The second sidewall faces the first sidewall. The second sidewall has a plurality of second inclined faces 181c and a second flat face 181d to have a stepped shape. Each of the second inclined faces 181c forms the first inclined angle (θ1) with respect to the first substrate 110. The second flat face 181d is formed between the second inclined faces 181c to connect the second inclined faces 181c. The first incident angle (θ1) is preferably less than about 30°.

As shown in FIG. 11 and FIG. 12, a first alignment film 150 has rubbing grooves aligned in a first direction (D1). The first and second inclined faces 181a and 181c and the first and second flat faces 181b and 181d of FIG. 8 show the case in which the contact hole 185 is cut along A–A' line of FIG. 12. The first direction (D1) is from the first inclined faces 181a to the second inclined faces 181c. The first alignment film 150 is formed by rubbing a thin film (not shown) in the first direction (D1) or from the first inclined faces 181a to the second inclined faces 181c. The first inclined faces 181a are rubbed and then the second inclined faces 181c are rubbed, and the sidewalls 181 have a gentle slope. Accordingly, the alignment force may be enhanced at the sidewalls 181 of the contact hole 185. In addition, the first and the second flat faces 181b and 181d enhance the alignment force at the sidewalls 181 of the contact hole 185.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A liquid crystal display apparatus comprising:
   an array substrate including:
      a first substrate;
      an insulating layer having a contact bole, the contact bole having a first sidewall and a second sidewall, the first sidewall having a first inclined face forming a first angle with respect to the first substrate, the second sidewall facing the first sidewall and having a second inclined face forming a second angle with respect to the first substrate, the second angle being greater than the first angle;
      a first alignment layer formed on the insulating layer, the first alignment layer aligned from the first sidewall toward the second sidewall;
   a color filter substrate; and
   a liquid crystal layer disposed between the array substrate and the color filter substrate.

2. The liquid crystal display apparatus of claim 1, wherein the first angle is an acute angle.

3. The liquid crystal display apparatus of claim 1, wherein the first angle is about 30° or less.

4. The liquid crystal display apparatus of claim 1, wherein the second angle is a range of about 30° to about 60°.

5. The liquid crystal display apparatus of claim 1, wherein the first sidewall is rubbed before the second sidewall is rubbed.

6. The liquid crystal display apparatus of claim 1, wherein the first sidewall has a plurality of the first inclined faces and a flat face to have a stepped shape, each of the first inclined faces forms the first angle with respect to the first substrate, the flat face is formed between the first inclined faces; and
   wherein the second sidewall has the second inclined face forming the second angle with respect to the first substrate, and the second angle is greater than the first angle.

7. The liquid crystal display apparatus of claim 6, wherein the first sidewall is rubbed before the second sidewall is rubbed.

8. The liquid crystal display apparatus of claim 1, wherein the first sidewall has a plurality of the first inclined faces and a first flat face to have a, first stepped shape, each of the first inclined faces forms the first angle with respect to the first substrate, the flat face is formed between the first inclined faces; and
   wherein the second sidewall has a plurality of the second inclined faces and a second flat face to have a second stepped shape, each of the second inclined faces forms the first angle with respect to the first substrate, the second flat face is formed between the second inclined faces.

9. The liquid crystal display apparatus of claim 1, wherein the insulating layer includes a photosensitive organic insulating layer.

10. The liquid crystal display apparatus of claim 1, wherein the insulating layer includes a photosensitive organic insulating layer and a non-photosensitive organic insulating layer.

11. The liquid crystal display apparatus of claim 1, wherein the array substrate further includes an embossing pattern formed on the insulating layer.

12. The liquid crystal display apparatus of claim 11, wherein the embossing pattern has repeated pairs of a concave portion and a convex portion, the concave portion and the convex portion having heights different from each other.

13. The liquid crystal display of claim 1, wherein the color filter substrate further comprises:
   a second substrate; and
   a second alignment layer formed on the second substrate.

14. The liquid crystal display apparatus of claim 13, wherein the second alignment layer is rubbed in a second direction substantially perpendicular to the first direction.

15. A method of manufacturing a liquid crystal display apparatus comprising:
   depositing an insulating layer on a first substrate of an array substrate;
   forming a contact hole in the insulating layer, the contact hole having a first sidewall and a second sidewall;
   forming a first inclined face having a first angle with respect to the first substrate at the first sidewall;

forming a second inclined face having a second angle with respect to the first substrate at the second sidewall, the second angle being greater than the first angle;

depositing a thin film on the insulating layer having the contact hole;

forming a first alignment layer on the insulating layer by rubbing the thin film in a first direction;

forming a second alignment layer on a second substrate of a color filter substrate in a second direction;

coupling the array substrate to the color filter substrate; and interposing a liquid crystal layer between the array substrate and the color filter substrate.

16. The method of manufacturing a liquid crystal display apparatus of claim 15, wherein the first direction is from the first sidewall to the second sidewall.

17. The method of manufacturing a liquid crystal display apparatus of claim 15, further comprising:

forming a switch device on the first substrate of the array substrate, wherein the insulating layer is formed on the first substrate having the switching device, and a part of the switching device is exposed by the contact hole; and uniformly forming an electrode layer on the switching device and the insulating layer, wherein the thin film is deposited and rubbed on the electrode layer in the first direction to form the first alignment layer on the electrode layer.

18. The method of manufacturing a liquid crystal display apparatus of claim 17, wherein forming the contact hole in the insulating layer comprises:

depositing a first mask having a full exposure area and a slit exposure area on the insulating layer, the full exposure area corresponding to the contact hole, and the slit exposure area corresponding to the first and the second sidewalls;

exposing the insulating layer on which the first mask is deposited; and developing the insulating layer to form at least one the inclined face on the first and the second sidewalls.

19. The method of manufacturing a liquid crystal display apparatus of claim 18, wherein the thin film comprises a polyimide thin film.

20. The method of manufacturing a liquid crystal display apparatus of claim 17, further comprising forming an embossing pattern on the insulating layer before forming the electrode layer, the embossing pattern having repeated pairs of a concave portion and a convex portion.

21. The method of manufacturing a liquid crystal display apparatus of claim 20, wherein forming the embossing pattern comprises:

depositing a second mask on the insulating layer, the second mask having a first half exposure area corresponding to the first sidewall, the second sidewall and the concave portion of the embossing pattern and a second half exposure area corresponding to a flat surface between the first and second sidewalls;

exposing the insulating layer on which the second mask is deposited; and developing the insulating layer to form the embossing pattern and at least one the flat surface.

22. The method of manufacturing a liquid crystal display apparatus of claim 15, wherein the first angle is about 30° or less.

* * * * *